Figure 1:
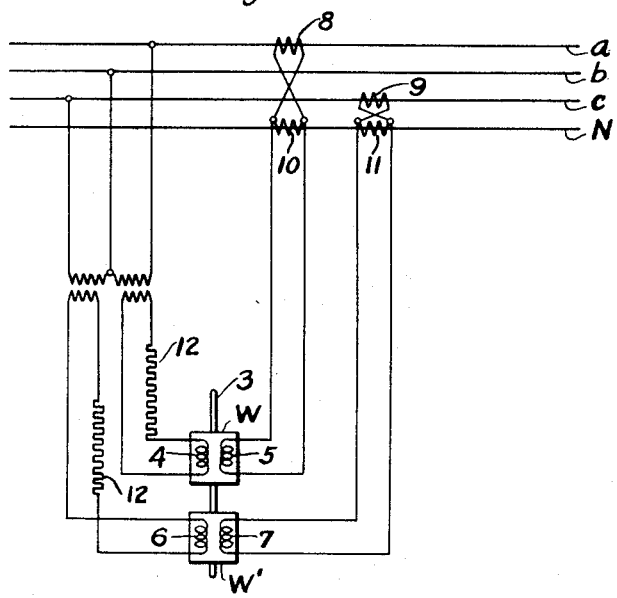

Dec. 12, 1933.    R. D. EVANS    1,939,044

PHASE SEQUENCE WATTMETER SYSTEM

Filed July 3, 1931

WITNESSES:
Leon J. Jaza
Wm. C. Groome

INVENTOR
Robert D. Evans
BY
O. B. Buchanan
ATTORNEY

UNITED STATES PATENT OFFICE 1,939,044

PHASE-SEQUENCE WATTMETER SYSTEM

Robert D. Evans, Swissvale, Pa., assignor to Westinghouse Electric & Manufacturing Company, a corporation of Pennsylvania Application July 3, 1931. Serial No. 548,592

10 Claims. (Cl. 172—245)

My invention relates to phase-sequence wattmeter systems and it has particular relation to a wattmeter system for measuring the total watts, either real or reactive, in a four-wire, three-phase system having (preferably nearly balanced) line-to-neutral, single-phase loads, say at 120 volts, and balanced polyphase apparatus connected across the three delta-phase terminals of, say, 208 volts.

In such four-wire systems, the accurate determination of the total power utilized has heretofore been quite difficult, requiring a plurality of wattmeters, on account of the slightly unbalanced load conditions. Expressing the real and reactive powers P and Q in phase-sequence quantities, in accordance with the system of symmetrical coordinates which is now the accepted method of solving unbalanced polyphase problems, we have $$P + jQ = P_1 + P_2 + P_0 + j(Q_1 + Q_2 + Q_0),$$

where the subscripts 1, 2 and 0 refer to the positive, negative and zero sequence components respectively. The real power may also be written $$P = \check{E}_1 \hat{I}_1 + \check{E}_2 \hat{I}_2 + \check{E}_0 \hat{I}_0,$$

(the real part only).

In four-wire systems of the type just mentioned, the zero-sequence impedance is usually rather low, as compared to the negative-phase-sequence impedance, so that the zero-sequence voltage $\check{E}_0$ is so small that the term $\check{E}_0 \hat{I}_0$ may usually or frequently be neglected without introducing more than a small error. When the single-phase line-to-neutral loads are substantially balanced, the zero-sequence current $\hat{I}_0$ is also substantially zero, thereby also contributing to make the term $\check{E}_0 \hat{I}_0$ negligibly small. Even though some power-line customer should take a heavy unbalanced single-phase line-to-neutral load, the effect of my metering system is to slightly penalize such a customer, increasing his bill by an amount corresponding to the increased losses due to zero-sequence currents in the power system, as pointed out in a paper by Dr. Fortescue in American Institute of Electrical Engineers Transactions, vol. 42, 1923, page 363.

By making no attempt to meter this zero-sequence power component, I have been able to produce a metering system utilizing only two meter elements, which may easily be mounted to operate on the same disc, so that a single meter, of substantially standard size and construction, may be utilized for securing a substantially accurate measure of the real or reactive powers P or Q, according to the connections.

In all such metering systems, one of the important considerations, which is insisted upon by most customers today, is that the metering system shall be simple, and easily checked as to accuracy, without depending upon complicated networks and calculations for arriving at a determination of its accuracy. The metering system which I have evolved fully meets these requirements.

Figure 2:
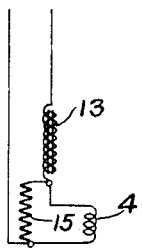
Figure 3:
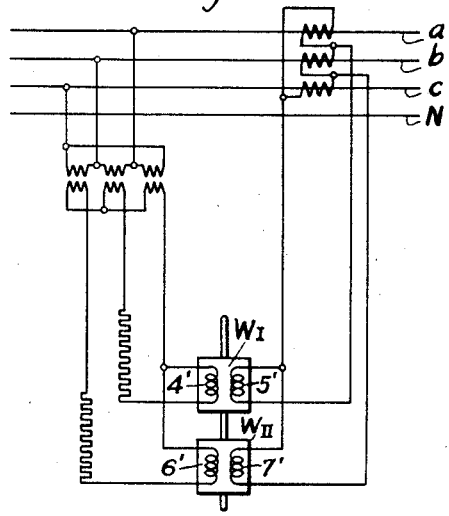

In the drawing,

Figure 1 is a diagrammatic view of circuits and apparatus embodying my invention in a preferred form, Fig. 2 is a partial view showing how the connections would be changed to measure reactive power instead of real power, and Fig. 3 is a view similar to Fig. 1, showing an equivalent circuit.

In Fig. 1, the four-wire, three-phase system is shown at $a$, $b$, $c$, N, where $a$, $b$, $c$ are the three-phase conductors and N is the neutral conductor. The meter consists of two wattmeter elements W and W', which may be either two complete wattmeters or simply two wattmeter field elements operating on a single disc (not shown). The essential fact that the two wattmeter elements exert torque on the same shaft is indicated in the drawing by showing a single wattmeter shaft 3.

The wattmeter element W has a voltage winding 4 and a current winding 5. In like manner, the other wattmeter element W' has a voltage winding 6 and a current winding 7. The two voltage windings 4 and 6 are energized from a potential transformer bank so that the voltage winding 4 is impressed with a voltage $(\check{E}_a - \check{E}_b)$, whereas the voltage winding 6 is impressed with a voltage $(\check{E}_c - \check{E}_b)$, where $\check{E}_a$, $\check{E}_b$ and $\check{E}_c$, in this case, represent the star voltages of the system.

The current coils 5 and 7 are energized from four current transformers 8, 9, 10 and 11, the first two current transformers being in two of the phase conductors, such as $a$ and $c$, respectively, and the last two current transformers being in the neutral N, or these two current transformers may be combined into a single transformer having two secondary windings. The ratios of the numbers of turns of the primary and secondary windings of the current transformers are such that the transformers in the neutral conductor N respond to one-third of the value of the current in the neutral conductor, whereas the transformers in the phase-conductors $a$ and $c$ respond to the full values of the currents in said conductors. The connections are made so that the current winding 5 of the wattmeter element W is energized in response to $(\hat{I}_a - \hat{I}_N/3)$, whereas the current winding 7 of the other wattmeter element W' is energized in accordance with $(\hat{I}_c - \hat{I}_N/3)$.

The watts or torque measured or produced in or by the two wattmeter elements W and W' may be indicated by the symbols W and W', as follows, utilizing the well-known symbol $\alpha$ to indicate one of the cube roots of unity, so that $\alpha + \alpha^2 + 1 = 0$:

$$W = (\check{E}_a - \check{E}_b)\left(\hat{I}_a - \frac{I_N}{3}\right) = (\check{E}_1 + \check{E}_2 - \alpha^2\check{E}_1 - \alpha\check{E}_2)(\hat{I}_1 + \hat{I}_2)$$

$$W' = -(\check{E}_b - \check{E}_c)\left(\hat{I}_c - \frac{I_N}{3}\right) = -(\alpha^2\check{E}_1 + \alpha\check{E}_2 - \alpha\check{E}_1 - \alpha^2\check{E}_2)(\alpha^2\hat{I}_1 + \alpha\hat{I}_2)$$

$$W = \check{E}_1\hat{I}_1(1-\alpha^2) + \check{E}_1\hat{I}_2(1-\alpha^2) + \check{E}_2\hat{I}_1(1-\alpha) + \check{E}_2\hat{I}_2(1-\alpha)$$

$$W' = -\check{E}_1\hat{I}_1(\alpha-1) - \check{E}_1\hat{I}_2(1-\alpha^2) - \check{E}_2\hat{I}_1(1-\alpha) - \check{E}_2\hat{I}_2(\alpha^2-1)$$

$$W + W' = 3\check{E}_1\hat{I}_1 + 3\check{E}_2\hat{I}_2.$$

It will be observed that each wattmeter element develops a torque proportional to the product of the voltage and current which are supplied to its respective voltage and current windings. It will further be noted that one wattmeter develops a torque which is responsive to the algebraic sum of a certain coefficient $\check{a}$ times the positive-sequence watts $\check{E}_1\hat{I}_1$ and another coefficient $\check{b}$ times the negative-sequence watts $\check{E}_2\hat{I}_2$ plus an unwanted quantity or quantities including the product or products of a voltage component or components of one phase sequence times a current component or components of another phase sequence. The other wattmeter element develops a torque which is responsive to the algebraic sum of $\check{b}$ times the positive-sequence watts plus $\check{a}$ times the negative-sequence watts minus the same unwanted quantity or quantities, so that the total response is equal to $(\check{a} + \check{b})$ times the sum of the positive and negative-sequence watts. In the particular case shown in the drawing, $$\check{a} = 1 - \alpha^2$$

and $$\check{b} = 1 - \alpha,$$

so that $$\check{a} + \check{b} = 3.$$

If it is desired to have a composite wattmeter respond to reactive watts instead of real watts, the voltage windings 4 and 6, instead of being connected in series with an external resistor 12, as in Fig. 1, which is the usual wattmeter connection, may be connected in series with an external inductor 13, as indicated in Fig. 2, which causes the current traversing the voltage coil to lag substantially 90° behind the applied voltage. The lag of the currents in the voltage coils of the wattmeter elements may be made exactly 90° by means of a suitable shunt 15 connected across each voltage coil, as indicated in Fig. 2, said shunt being either a high resistance or a high capacitance, preferably the former.

Since the difference of the two star voltages $(\check{E}_a - \check{E}_b)$ equals the delta voltage $\check{E}_C$, indicated by a capital subscript, and since $(\check{E}_b - \check{E}_c) = \check{E}_A$, it will be observed that the wattmeter elements W and W' in Fig. 1 respond, respectively, to the delta voltage in phase C times the star current in phase $a$, and to the delta voltage in phase A times the star current in phase $c$, with the zero-sequence component removed from the star quantities. Thus $$W = \check{E}_C(\hat{I}_a - \hat{I}_0)$$

and $$W' = -\check{E}_A(\hat{I}_c - \hat{I}_0)$$

These equations hold true for star voltages and delta currents as well as for delta voltages and star currents. Thus, we may make $$W_I = (\check{E}_a - \check{E}_0)\hat{I}_C = \left(\check{E}_a - \frac{\check{E}_a + \check{E}_b + \check{E}_c}{3}\right)(\hat{I}_a - \hat{I}_b)$$

and $$W_{II} = -(\check{E}_c - \check{E}_0)\hat{I}_A = -\left(\check{E}_c - \frac{\check{E}_a + \check{E}_b + \check{E}_c}{3}\right)(\hat{I}_b - \hat{I}_c).$$

$$W_I = (\check{E}_1 + \check{E}_2)[\hat{I}_1(1-\alpha) + \hat{I}_2(1-\alpha^2)]$$

$$W_{II} = -(\alpha\check{E}_1 + \alpha^2\check{E}_2)[\hat{I}_1(\alpha - \alpha^2) + \hat{I}_2(\alpha^2 - \alpha)]$$

$$W_I + W_{II} = 3(\check{E}_1\hat{I}_1 + \check{E}_2\hat{I}_2) = 3(P_1 + P_2).$$

Fig. 3 shows a two-element wattmeter in accordance with these equations. One wattmeter-element $W_I$ has a voltage coil 4' responding to $$\tfrac{1}{3}(\check{E}_C - \check{E}_B) = \tfrac{1}{3}(\check{E}_a - \check{E}_b) - \tfrac{1}{3}(\check{E}_a - \check{E}_a) = (\check{E}_a - \check{E}_0),$$

and a current coil 5' responding to $(\hat{I}_a - \hat{I}_b)$ which equals $\hat{I}_C$. The other wattmeter-element $W_{II}$ has a voltage coil 6' responding to $$\tfrac{1}{3}(\check{E}_A - \check{E}_B) = \tfrac{1}{3}(\check{E}_b - \check{E}_c) - \tfrac{1}{3}(\check{E}_c - \check{E}_a) = -(\check{E}_c - \check{E}_0),$$

and a current coil 7' responding to $(\hat{I}_b - \hat{I}_c)$ which equals $\hat{I}_A$.

In the metering devices of Fig. 3, one meter-element $W_I$ responds proportionately to the vertorial product of a star voltage $\check{E}_a$ and the next leading delta current $\hat{I}_C$, in the delta phase which leads the line-to-neutral voltage $\check{E}_a$ by 30° at unity power factor, there being no zero-sequence component in either factor of the product; while the other meter-element $W_{II}$ responds in the opposite direction proportionately to the vectorial product of the star voltage $\check{E}_c$, which leads the voltage $\check{E}_a$ by 120° when the loads are balanced, and the next leading delta current $\hat{I}_A$, in the delta phase which leads the line-to-neutral voltage $\check{E}_c$ by 30° at unity power factor, there being no zero-sequence component in either factor of the product. As before stated, the voltage and current symbols may be interchanged.

Whenever, in the foregoing specification, or in the appended claims, I refer to a meter or wattmeter, I mean to include either an indicating, integrating, recording or contact-making instrument or relay, responsive to the quantities indicated.

It will be obvious that many changes and modifications may be made, within the spirit of my invention, and I do not desire that the appended claims shall be limited by the specific constructions illustrated in the drawing, except as may be required by the language of the claims, when read in the light of the prior art.

I claim as my invention:

1. A metering-aggregate for measuring the total amount of power on a four-wire, three-phase, power-distribution line having approximately balanced single-phase line-to-neutral loads and three-phase loads, said metering-aggregate comprising two wattmeter elements exerting torque on the same shaft, each wattmeter element having a current winding and a voltage winding, and means for so energizing the several voltage and current windings of the two wattmeter elements that one element responds to the algebraic sum of $\check{a}$ times the positive-sequence watts plus $\check{b}$ times the negative-sequence watts plus an unwanted quantity or quantities including the product or products of a voltage component or components of one phase-sequence times a current component or components of another phase sequence, $\check{a}$ and $\check{b}$ being any coefficients, while the other element responds to the algebraic sum of $\check{b}$ times the positive-sequence watts plus $\check{a}$ times the negative-sequence watts minus the same unwanted quantity or quantities.

2. A metering-aggregate for measuring the total amount of power on a four-wire, three-phase, power-distribution line having approximately balanced single-phase line-to-neutral loads and three-phase loads, said metering-aggregate comprising two wattmeter elements exerting torque on the same shaft, each wattmeter element having a current winding and a voltage winding, and means for so energizing the several voltage and current windings of the two wattmeter elements that one element responds to the algebraic sum of $\check{a}$ times the positive-phase-sequence watts plus $\check{b}$ times the negative-phase-sequence watts plus an unwanted quantity or quantities including the product or products of a voltage component or components of one phase-sequence times a current component or components of another phase-sequence, $\check{a}$ and $\check{b}$ being any coefficients, while the other element responds to the algebraic sum of $\check{b}$ times the positive-phase-sequence watts plus $\check{a}$ times the negative-phase-sequence watts minus the same unwanted quantity or quantities, where $\check{a}=1-\alpha^2$, and $\check{b}=1-\alpha$, whereas $\alpha$ is one of the cube roots of unity.

3. A metering-aggregate for measuring the total amount of power on a four-wire, three-phase, power-distribution line having approximately balanced single-phase line-to-neutral loads and three-phase loads, said metering-aggregate comprising two wattmeter elements exerting torque on the same shaft, each wattmeter element having a current winding and a voltage winding, and means for energizing the several voltage and current windings of the two wattmeter elements, the first wattmeter element being designed and connected to respond to any function of voltage and current which includes two components, one component being any function of the power which is to be measured by the metering-aggregate as a whole, and the other component being any other function of the current and voltage, the second wattmeter element being designed and connected to respond to any function of voltage and current which includes two components, one component being any function of the power which is to be measured by the metering-aggregate as a whole, and the other component being the same other function to which the first wattmeter element responds, but opposite in the direction of response.

4. A metering-aggregate for measuring the sum of the positive and negative-sequence power on a four-wire, three-phase, power-distribution line having single-phase line-to-neutral loads and three-phase loads, said metering-aggregate comprising two wattmeter elements exerting torque on the same shaft, each wattmeter element having a current winding and a voltage winding, so that each wattmeter element responds to the vectorial product of the current and voltage applied to its windings, and means for energizing one of said wattmeter elements to respond to the vectorial product of $(\check{M}_a-\check{M}_b)$ and $(\hat{N}_a-\hat{N}_N/3)$, and means for energizing the other of said wattmeter elements to respond to the vectorial product of $(\check{M}_c-\check{M}_b)$ and $(\hat{N}_c-\hat{N}_N/3)$, where the symbol M represents one of the pair comprising currents and voltages, measured in one of the ways comprising delta and star, and the symbol N represents the other of the pair comprising voltages and currents, respectively, measured in one of the ways comprising delta and star, and the subscripts $a$, $b$, $c$ and N refer respectively to the three phases and the neutral phase or three times the zero-sequence phase component.

5. A metering-aggregate for measuring the sum of the positive and negative-sequence power on a four-wire, three-phase, power-distribution line having single-phase line-to-neutral loads and three-phase loads, said metering-aggregrate comprising two wattmeter elements exerting torque on the same shaft, each wattmeter element having a current winding and a voltage winding, so that each wattmeter element responds to the vectorial product of the current and voltage applied to its windings, and means for energizing one of said wattmeter elements to respond to the vectorial product of $(\check{E}_a-\check{E}_b)$ and $(\hat{I}_a-\hat{I}_N/3)$, and means for energizing the other of said wattmeter elements to respond to the vectorial product of $(\check{E}_c-\check{E}_b)$ and $(\hat{I}_c-\hat{I}_N/3)$, the symbols $\check{E}_a$, $\check{E}_b$ and $\check{E}_c$ representing star voltages in the respective phases $a$, $b$ and $c$, and the symbols $\hat{I}_a$, $\hat{I}_c$ and $\hat{I}_N$ representing the currents in the phase conductors $a$ and $c$ and in the neutral.

6. A metering-aggregate for measuring the total amount of reactive power on a four-wire, three-phase, power-distribution line having single-phase line-to-neutral loads and three-phase loads, said metering-aggregate comprising two wattmeter elements exerting torque on the same shaft, each wattmeter element having a current winding and a voltage winding, and means for so energizing the several voltage and current windings of the two wattmeter elements that one element responds to the algebraic sum of $\check{a}$ times the positive-sequence reactive watts plus $\check{b}$ times the negative-sequence reactive watts plus an unwanted quantity or quantities including the product or products of a voltage component or components of one phase-sequence times a current component or components of another phase sequence, $\check{a}$ and $\check{b}$ being any coefficients, while the other element responds to the algebraic sum of $\check{b}$ times the positive-sequence reactive watts plus $\check{a}$ times the negative-sequence reactive watts minus the same unwanted quantity or quantities.

7. A metering-aggregate for measuring the sum of the positive and negative-sequence reactive power on a four-wire, three-phase, power-distribution line having single-phase line-to-neutral loads and three-phase loads, said metering-aggregate comprising two wattmeter elements exerting torque on the same shaft, each wattmeter element having a current winding and a voltage winding, so that each wattmeter element responds to the vectorial product of the current and voltage applied to its windings, and means for energizing one of said wattmeter elements to respond to the vectorial product of $\frac{1}{3}(\check{E}_a-\check{E}_b)$ and $\hat{I}_a-\hat{I}_N/3$), and means for energizing the other of said wattmeter elements to respond to the vectrial product of $\frac{1}{3}(\check{E}_c-\check{E}_b)$ and $(\hat{I}_c-\hat{I}_N/3)$, the symbols $\check{E}_a$, $\check{E}_b$ and $\check{E}_c$ representing star voltages in the respective phases $a$, $b$ and $c$, and the symbols $\hat{I}_a$, $\hat{I}_c$ and $\hat{I}_N$ representing the currents in the phase conductors $a$ and $c$ and in the neutral.

8. A metering-aggregate for a four-wire three-phase system having line-to-neutral single-phase loads and polyphase loads, comprising two wattmeter-elements responding to the products of the vectorial quantities $M_C-(N_a-N_0)$ and $-M_A(N_c-N_0)$, where the symbol M represents either a voltage-vector or a conjugate current-vector, while N represents either a conjugate current-vector or a voltage-vector, respectively, the subscripts A and C referring to delta phases, and the subscripts $a$, $c$ and $0$ referring to two star phases and the star zero-phase-sequence component, respectively, each of said two wattmeter-elements having a current-responsive winding means and a voltage-responsive winding means, means for energizing one of the winding means of the first wattmeter-element in accordance with the quantity $M_C$, means for energizing the other winding means of the first wattmeter-element in accordance with the quantity $(N_a-N_0)$, means for energizing one of the winding means of the second wattmeter-element in accordance with the quantity $M_A$, and means for energizing the other winding means of the second wattmeter-element in accordance with the quantity $(N_c-N_0)$, whereby the responses to $M_C(N_a-N_0)$, and $-M_A(N_c-N_0)$ are obtained.

9. A metering-aggregate for a four-wire three-phase system having line-to-neutral single-phase loads and polyphase loads, comprising two wattmeter elements responding to $\frac{1}{3}(\check{E}_C-\check{E}_B)\hat{I}_C$ and $\frac{1}{3}(\check{E}_A-\check{E}_B)\hat{I}_A$, respectively, the symbols $\check{E}_A$, $\check{E}_B$ and $\check{E}_C$ representing the delta line voltages, and the symbols $\hat{I}_A$ and $\hat{I}_C$ representing the delta currents corresponding to $\check{E}_A$ and $\check{E}_C$, respectively, each of said two wattmeter elements having a current-responsive winding means and a voltage-responsive winding means, means for energizing the voltage-responsive winding means of the first wattmeter element in accordance with some function of $(\check{E}_C-\check{E}_B)$, means for energizing the current-responsive winding means of the first wattmeter element in accordance with some function of $\hat{I}_C$, means for energizing the voltage-responsive winding means of the second wattmeter element in accordance with some function of $(\check{E}_A-\check{E}_B)$, and means for energizing the current-responsive winding means of the second wattmeter element in accordance with some function of $\hat{I}_A$, whereby the responses to $\frac{1}{3}(\check{E}_C-\check{E}_B)\hat{I}_C$ and $\frac{1}{3}(\check{E}_A-\check{E}_B)\hat{I}_A$ are obtained.

10. A metering-aggregate for a four-wire three-phase system having line-to-neutral single-phase loads and polyphase loads, comprising two wattmeter elements, each wattmeter element comprising two winding means so related as to develop a torque responsive to a function of the product of respective energizations of said two winding means, means for energizing one of the winding means of the first wattmeter element proportionately to a star current or voltage, respectively, with no zero-phase-sequence component in said proportionality, means for energizing the other winding means of the first wattmeter element proportionately to the next leading delta voltage or current, respectively, with no zero-phase-sequence component in said proportionality, means for energizing one of the winding means of the second wattmeter element proportionately to the star current or voltage which leads the first-mentioned star current or voltage, respectively, with no zero-phase-sequence component in said proportionality, and means for energizing the other winding means of the second wattmeter element proportionately to the next leading delta voltage or current, respectively, with no zero-phase-sequence component in said proportionality, the direction of response of the second wattmeter element being opposite to that of the first.

ROBERT D. EVANS.